United States Patent
Cooksey et al.

(10) Patent No.: US 8,858,310 B2
(45) Date of Patent: Oct. 14, 2014

(54) COMBINE SIEVE ASSEMBLY WITH AN AUGER TROUGH CLEAN-OUT ASSEMBLY

(75) Inventors: William Cooksey, Geneseo, IL (US);
Jason Coppinger, Davenport, IA (US);
Craig Murray, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/570,112

(22) Filed: Aug. 8, 2012

(65) Prior Publication Data

US 2014/0045563 A1   Feb. 13, 2014

(51) Int. Cl.
*A01B 71/08*   (2006.01)

(52) U.S. Cl.
USPC .......................................... 460/103; 460/104

(58) Field of Classification Search
USPC .......... 460/103, 104, 109, 75, 114; 198/860.5, 198/657, 629
See application file for complete search history.

(56) References Cited

U.S. PATENT DOCUMENTS

| | | | | |
|---|---|---|---|---|
| 2,180,681 A | * | 11/1939 | Johnson | 198/629 |
| 2,743,728 A | * | 5/1956 | Carlson | 460/109 |
| 3,145,715 A | * | 8/1964 | Horn | 460/17 |
| 3,470,881 A | * | 10/1969 | Knapp et al. | 460/109 |
| 3,719,734 A | * | 3/1973 | Petzetakis | 264/51 |
| 3,751,197 A | * | 8/1973 | Petzetaris | 425/4 R |
| 4,090,604 A | * | 5/1978 | Reifert | 198/860.5 |
| 4,128,160 A | * | 12/1978 | Deal et al. | 198/657 |
| 4,436,518 A | * | 3/1984 | Buss | 428/595 |
| 4,445,260 A | * | 5/1984 | Buss | 29/890.14 |
| 4,466,447 A | * | 8/1984 | Hoefer et al. | 460/13 |
| 4,631,837 A | * | 12/1986 | Magoon | 34/353 |
| 4,684,458 A | | 8/1987 | Grotto | |
| 4,798,283 A | * | 1/1989 | Booth et al. | 198/860.5 |
| 5,024,631 A | * | 6/1991 | Heidjann et al. | 460/75 |
| 5,375,694 A | * | 12/1994 | Sanford et al. | 198/771 |
| 5,490,372 A | * | 2/1996 | Schlueter | 56/33 |
| 5,678,397 A | | 10/1997 | Shelbourne et al. | |
| 5,901,541 A | | 5/1999 | Lindquist | |
| 5,971,600 A | * | 10/1999 | Paterson et al. | 366/150.1 |
| 6,120,233 A | | 9/2000 | Adam | |
| 6,238,285 B1 | | 5/2001 | Gryspeerdt et al. | |
| 6,602,130 B1 | | 8/2003 | Manning et al. | |
| 6,758,745 B2 | * | 7/2004 | Van Der Haegen et al. | 460/109 |
| 6,865,871 B2 | | 3/2005 | Patterson et al. | |
| 7,207,882 B2 | * | 4/2007 | Schmidt et al. | 460/46 |
| 7,395,650 B2 | | 7/2008 | Mossman et al. | |
| 7,444,798 B2 | | 11/2008 | Patterson et al. | |

(Continued)

FOREIGN PATENT DOCUMENTS

| | | | | |
|---|---|---|---|---|
| CA | 2080753 A | * | 4/1994 | E01H 10/00 |
| SU | 1591864 A | * | 9/1990 | A01F 12/60 |
| SU | 1667722 A1 | * | 8/1991 | A01F 12/60 |
| SU | 1697620 A1 | | 12/1991 | |

*Primary Examiner* — Árpád Fábián-Kovács
(74) *Attorney, Agent, or Firm* — Patrick M. Sheldrake; Seyed V. Sharifi T.

(57) ABSTRACT

An auger assembly for a combine harvester includes an auger trough having side walls with a length so as to extend laterally between opposed side sheets. Guide tracks are configured along bottom edges of the side walls. A flexible bottom cover member is slidably engaged within the guide tracks. The cover member is removably attached to the side walls by being slid into and out of the guide tracks from a longitudinal end of the side walls outboard of the side sheets for an auger clean-out procedure.

18 Claims, 6 Drawing Sheets

(56) References Cited

U.S. PATENT DOCUMENTS

| | | |
|---|---|---|
| 7,585,213 B2 | 9/2009 | Claerhout et al. |
| 7,585,214 B1 | 9/2009 | Johnson et al. |
| 7,632,183 B2 * | 12/2009 | Schmidt et al. .............. 460/104 |
| 8,146,231 B2 * | 4/2012 | Farley et al. .................... 29/464 |
| 2004/0184905 A1 * | 9/2004 | Kinzenbaw et al. .......... 414/526 |
| 2005/0277454 A1 * | 12/2005 | Couture ........................ 460/111 |
| 2006/0025188 A1 * | 2/2006 | Schmidt et al. .............. 460/114 |
| 2009/0107099 A1 | 4/2009 | Patterson et al. |
| 2009/0186674 A1 * | 7/2009 | Claerhout et al. ............ 460/103 |
| 2009/0215510 A1 * | 8/2009 | Schmidt et al. .............. 460/109 |
| 2012/0118135 A1 * | 5/2012 | Warren ........................ 89/36.02 |
| 2012/0160177 A1 * | 6/2012 | Dalrymple ................... 119/61.1 |

* cited by examiner

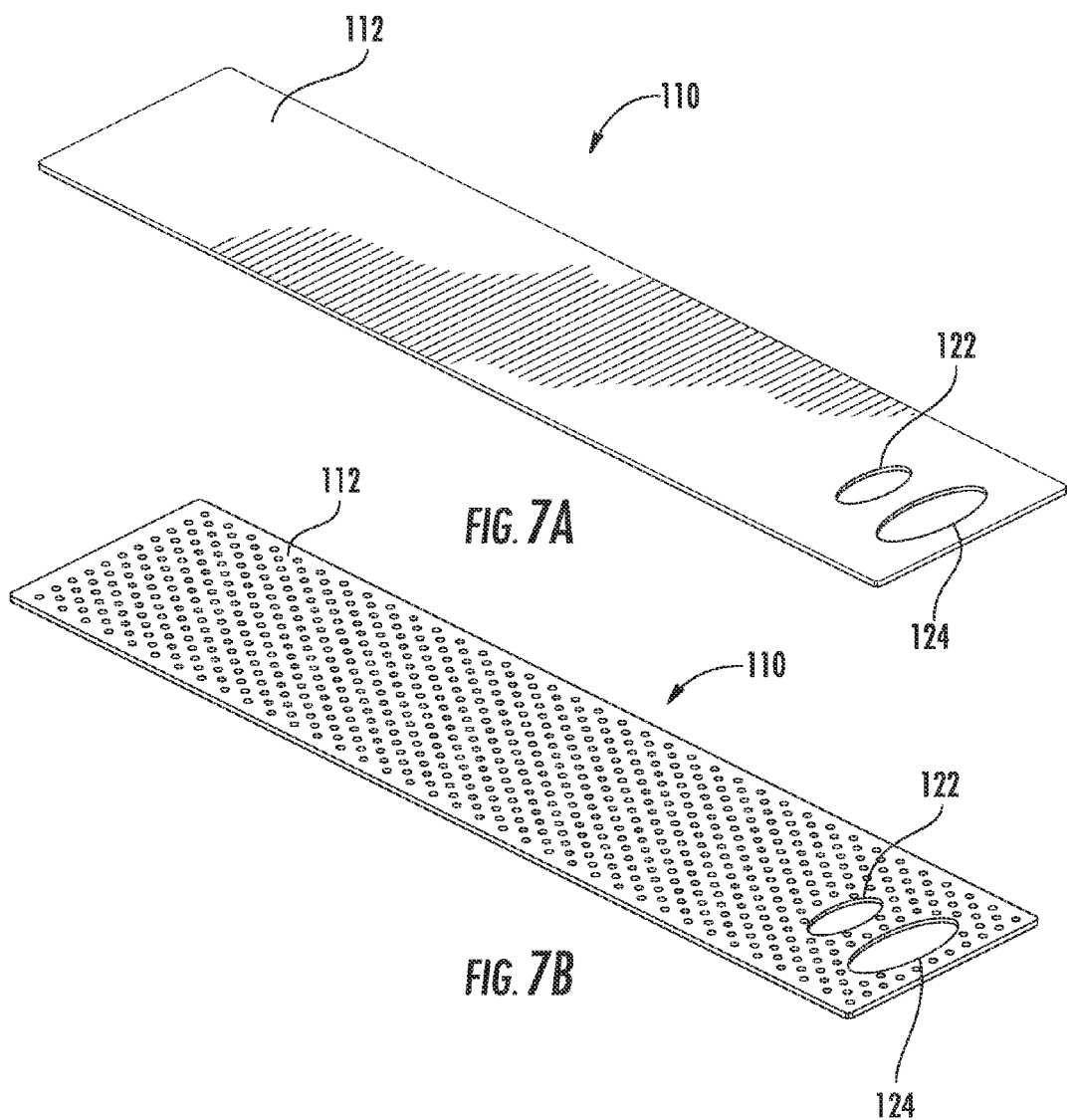

COMBINE SIEVE ASSEMBLY WITH AN AUGER TROUGH CLEAN-OUT ASSEMBLY

FIELD OF THE INVENTION

The present invention relates generally to conveying systems for a combine harvester, such as a clean grain or tailings conveying system, and more particularly to a construction of an auger conveyance trough used in such conveying systems.

BACKGROUND OF THE INVENTION

With conventional combine harvesters, the crops that are severed by the header are conveyed to a threshing and separating assembly where a rotor is rotated within a generally cylindrical chamber to thresh the crop. Grain, seed, or the like, is loosened and separated from the other crop material and falls onto a grain pan of a cleaning assembly, which typically includes a pre-cleaning sieve disposed above a second grain pan. The cleaning system typically includes a set of stacked sieves or shoes that are reciprocally moved, usually in the fore and aft directions, to separate or sift the grain from tailings and material other than grain (MOG). With many combines, as the grain is cleaned from the MOG, it falls through the sieves and drops onto or into one or more underlying clean grain pans that are disposed below the sieves, which pans typically include a plurality of elongated and longitudinally oriented clean grain collecting troughs positioned side-by-side across at least a portion of the width of the combine to receive the clean grain that falls through the set of sieves. Such collecting troughs are configured to receive the grain falling therein and to convey such grain therethrough towards an intersecting, cross, generally laterally extending, clean grain conveyance trough.

The laterally extending clean grain conveyance trough has a conveyance mechanism, often in the form of an auger, for moving and delivering the clean grain to an elevator that carries the clean grain up to a clean grain tank. For convenience of reference, the clean grain conveyance trough is referred to herein as the clean grain auger trough regardless of the particular conveyance mechanism that may be employed therewith for moving the clean grain through such trough.

During vibration of the sieves, air is blown upwardly and rearwardly through the sieves to carry lighter elements of the MOG, or chaff, away. The heavier elements and tailings that are too large to fall through the sieves and too heavy to be blown away are caused to be moved by the vibrations, generally rearwardly along the top surfaces of the sieves, towards and over rear edges of the sieves to fall onto a tailings pan located below and extending somewhat beyond such rear edges. The tailings pan, similarly to the clean grain pan, typically includes a plurality of elongated and longitudinally oriented tailings collecting troughs positioned side-by-side across at least a portion of the width of the combine to receive the tailings that fall from the rear edges of the sieves. The collecting troughs receive and convey the tailings towards an intersecting tailings conveyance trough.

The sidewardly extending tailings conveyance trough receives and conveys the tailings with a conveyance mechanism, often in the form of an auger extending therethrough, to a tailings return conveyor that carries the tailings upwardly, back to the cleaning or separating system of the combine, for reprocessing. For convenience of reference, the tailings conveyance trough will generally be referred to herein as the tailings auger trough regardless of the particular conveyance mechanism that may be employed for moving the tailings through such trough.

Although the clean grain auger trough and the tailings auger trough are generally effective in conveying and emptying the clean grain and tailings from the respective troughs, remnants of such materials, as well as dirt and other residue, can build up over time along the bottoms and edges of the auger troughs and at locations beyond the reach of the augers that extend through such auger troughs. This problem is exacerbated when moisture is introduced into the auger troughs and/or such remnants remain in the troughs as they are exposed to weather extremes. It is desirable to be able to remove as much of such remnants as possible, especially from the clean grain auger trough, to avoid in subsequent harvesting operations the mixture into the newly harvested grain of grain from an earlier harvesting and to avoid the fouling of the auger or other conveyance mechanisms in the auger troughs.

In combines, the ability to clean out the troughs has been essentially limited to the introduction of a pressurized stream of water into the end of an auger trough to try to wash out the remaining remnants, with modest success. In order to better clean out the auger troughs, some users have cut holes into the bottoms of the troughs, generally of limited size and somewhat centered along the length of troughs, to provide an access point for the introduction of pressurized streams of water or air and to permit access through such holes for manual clean out of at least some of the remnant material. After the clean-out process, the holes were sealed with removable plates mounted to the troughs to cover the holes during the subsequent operation of the combines. The plates thus functioned essentially as panels or doors along the undersides of the troughs.

More recently, some combines have been designed with auger troughs that include engineered doors along portions of the bottoms of the troughs, generally centered along the length of the troughs and designed to provide a tighter and more uniform fit as compared to the user-crafted panels. By removing bolts or like connector assemblies securing the doors to the troughs, a user could remove the doors to permit cleaning activities and could later reinstall such doors, again from beneath the combines.

Even with the engineered clean-out doors, the clean-out process has remained problematic due to the difficulties associated with the removal and re-installation of such doors and location of the doors beneath the combine. Often, the operator must access the doors while lying directly beneath the combine. When the doors are removed, the remnants typically fall onto the operator. The doors are unwieldy, particularly when handled while lying on one's back in a field. Since the doors encompass only a portion of the underside of the troughs, even when such doors have been removed for clean out activities, remnants of crop and other materials may remain at the ends of the troughs and at other areas along the troughs that are not located above the door locations or to which there would be only limited, if any, accessibility through such doors.

U.S. Pat. No. 7,585,213 describes an improved auger clean-out door wherein a rigid, removable door panel is engaged with and supported by the auger side walls, with the door extending essentially along the length of the auger trough. Engagement features at the ends of the panel ensure that the panel stays in place. These rigid (typically welded) panel assemblies are, however, adversely affected by a variety of normal manufacturing conditions that often cause the mating parts to have a poor profile match, such conditions including forming variability, welding (heat) distortion, deformation due to shipping and handling, and so forth. A poorly matching profile greatly increases the difficulty in assembling/servicing, and may cause poor sealing that results in grain loss/damage.

An improved auger trough that facilitates an easier and more effective clean-out without the necessity of an operator accessing the trough from beneath the combine would be a welcome advancement in the industry.

BRIEF DESCRIPTION OF THE INVENTION

Aspects and advantages of the invention will be set forth in part in the following description, or may be obvious from the description, or may be learned through practice of the invention.

In accordance with aspects of the invention, an auger assembly is provided for a combine harvester. In certain embodiments, the auger assembly includes an auger trough having side walls with a length so as to extend laterally between the opposed side sheets of the combine, with the side walls having respective longitudinally extending bottom edges. Guide tracks are configured along the bottom edges of the side walls. A flexible bottom cover member is slidably engaged within the guide tracks, and is thus removably attached to the side walls by being slid into and out of the guide tracks from a longitudinal end of the side walls outboard of the side sheets. With this unique auger assembly, the cover member is removable from the auger trough for a clean-out procedure without accessing the cover member from below the auger trough. The operator may remove the cover member at a location outboard of the combine side sheets by grasping and pulling the cover member out of the guide tracks in a lateral direction away from the combine.

In particular embodiments, the cover member is formed from a flexible sheet material that has a flat unrestrained shape. In other words, the sheet material lies flat against a support surface when not physically manipulated or restrained into another shape. A suitable sheet material may be, for example, an ultra-high-molecular-weight polyethylene (UHMW PE) material. The sheet material is conformable into a curved cross-sectional profile as the sheet material is fitted into and slid along the guide tracks and defines a bottom surface of the trough that generally conforms to the shape of the auger component within the trough.

The cover member may be a solid, continuous planar surface or, in certain embodiments, may be perforated along at least a section thereof, for example for harvesting edible bean or similar goods.

The guide tracks may be variously configured on the side walls of the auger trough. For example, the guide tracks may be separately formed members that are subsequently attached to the side walls by suitable means (e.g., bolts, spot welds, and so forth). In an alternate embodiment, the guide tracks may be integrally formed by the side walls. For example, the edge portion of the side walls may be bent or formed into guide tracks. The guide tracks may be continuous along the bottom edges of the side walls between the side sheets or, in alternate embodiments, may be discontinuous and spaced apart along the edges.

It should be appreciated that the guide tracks may have various suitable configurations for sliding receipt of the cover member. In a relatively simple embodiment, the guide tracks are C-shaped channel members fixed to the side walls.

The auger assembly may include any manner of suitable latch mechanism configured between the cover member and a respective one of the side sheets to retain the cover member in position relative to the side walls during operation of the combine. For example, the latch mechanism may include a biased tab member that is fixed to the side sheet and engages into a hole defined in the cover member.

It may be desired in certain embodiments to include a handle configured on a longitudinal end of the cover member to allow an operator to readily pull the cover member out of the guide tracks.

It should be understood that the auger assembly is not limited to any particular operational use. For example, the auger assembly may be used as one or both of a clean grain auger assembly and tailings auger assembly in the combine harvester.

The present invention also encompasses any configuration of a combine harvester that utilizes an auger assembly as set forth herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 7A is a perspective view of an embodiment of a flexible cover member for an auger trough; and FIG. 7B is a perspective view of an alternate embodiment of a flexible cover member for an auger trough.

DETAILED DESCRIPTION OF THE INVENTION

Figure 1:
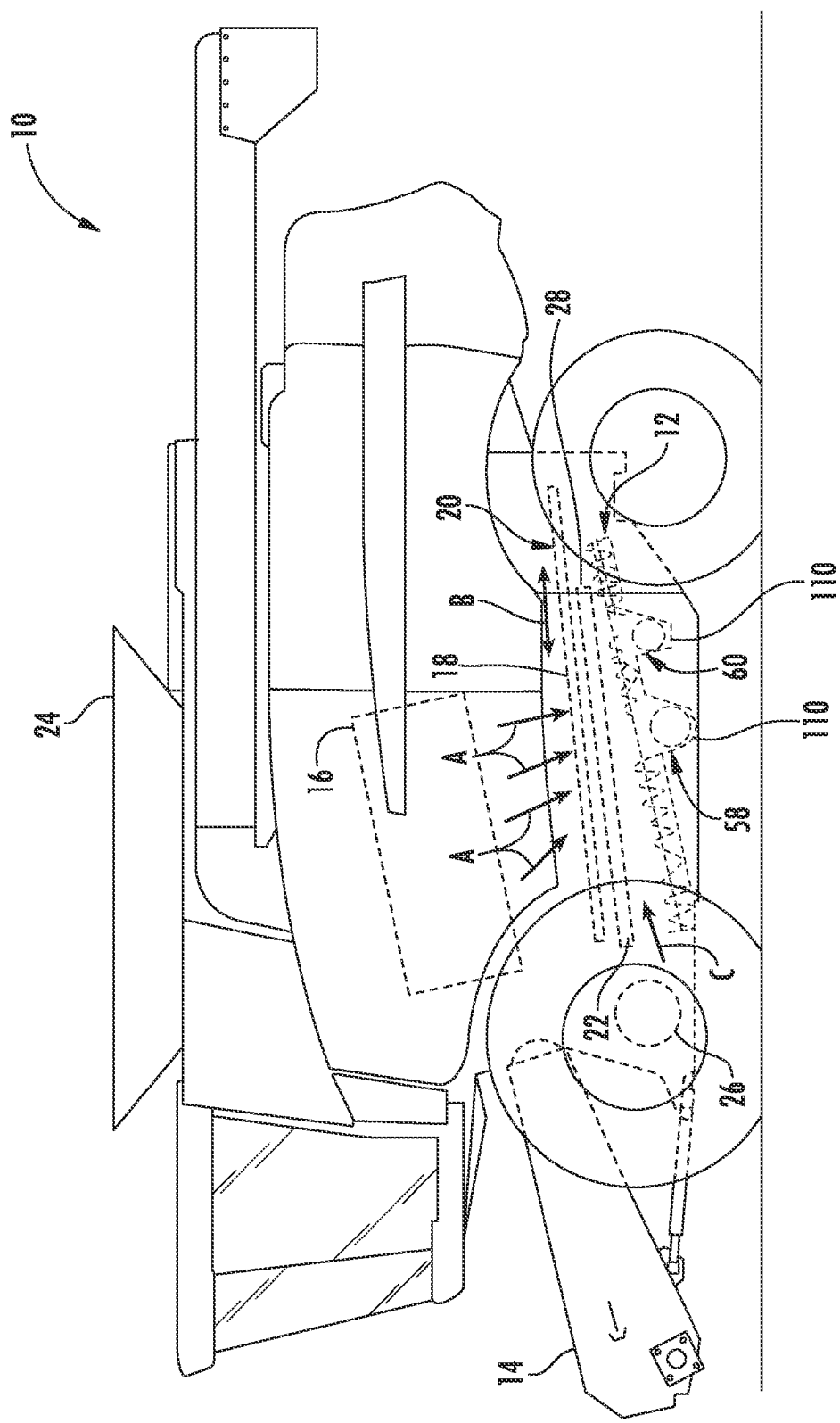
FIG. 1 is a perspective view of a combine harvester with an auger clean-out assembly.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, wherein like numbers refer to generally like items or features, FIG. 1 depicts a conventional combine harvester 10 having a feeder house 14 on a front end thereof, to which is connectable a header (not shown), operable to sever a swath of crops from a field as the combine 10 moves forward and to convey the severed crops to feeder house 14. Feeder house 14 includes an internal conveying system (not shown), for conveying the crops upwardly and rearwardly into the body of the combine 10 and into an inlet of a separating or threshing system 16. Threshing system 16 generally includes a rotor at least partially enclosed in a concave structure defining an arcuate space therebetween, and in which space the crop material is processed for separating grain from material other than grain (MOG), with the MOG being ejected rearwardly from the threshing system 16 through the rear end of the combine 10 for deposit on the field, as is well-known.

As threshing system 16 operates, crop material will fall and/or be conveyed therefrom, as denoted generally by arrows "A" in FIG. 1, onto an upper sieve 18 of a cleaning system 20 located below threshing system 16 within the body of combine 10. Such cleaning system 20 also includes a lower sieve 22 positioned below upper sieve 18 in a stacked relationship therewith. The sieves 18 and 22 are configured to be reciprocally moved or vibrated relative to one another to effect a sifting of material falling onto the upper sieve 18, as indicated by arrow "B" in FIG. 1.

As the crop material from the threshing system 16 falls onto upper sieve 18, air from a fan 26 is blown upwardly and rearwardly through sieves 18 and 22, as indicted by arrow "C" in FIG. 1. In conventional combines, this combination of air flow and the vibratory movement of the sieves 18 and 22 is meant to cause the lighter elements of the MOG, referred to also as chaff, to be blown upwardly and rearwardly away from sieves 18 and 22. Such chaff is typically blown into an optional chaff spreader (not shown), operable for distributing the chaff over a desired swath of the field from which the crop is cut, or directed into an optional chopper (also not shown), operable for mixing the chaff with straw for chopping and distributing such mix, or simply directed downwardly onto the field through a rear opening of the combine, all of which operations are well-known in the art.

The upper sieve 18 includes openings therethrough that are sized to allow separated grain as well as some smaller elements of MOG, sometimes referred to as tailings, to pass therethrough and to fall onto lower sieve 22 of the cleaning system 20, thus sifting the separated grain and tailings from larger elements of MOG. The larger elements of MOG that are unable to pass through upper sieve 18 are moved to the rear peripheral edge portion of the sieve by the vibratory movements of such sieve and fall either directly onto the underlying field or onto or into other apparatus for further processing, including chopping and/or spreading. Such further processing of the larger elements of MOG may be accomplished in various well-known manners.

The lower sieve 22 has smaller openings than upper sieve 18, such that the sieves 18 and 22 will act as a progressive sifting or cleaning mechanism for separating and cleaning grain from the tailings that were also able to pass through sieve 18. To facilitate such sifting action and the flow of grain through the stacked sieves 18 and 22, the sieves are vibrated or reciprocally moved, typically in a fore and aft direction, as denoted by arrow B. The grain that falls through lower sieve 22 into clean grain and tailings systems 12 of the combine 10 is considered to be clean grain that is desired to be collected and ultimately conveyed to a grain tank 24. The tailings that are allowed to pass through the upper sieve 18 often still contain some un-separated grain, and retention of such tailings for further processing to effect separation of the grain is generally desired. The tailings that are unable to pass through the smaller openings on lower sieve 22 are caused to move towards a rear peripheral edge portion 28 of sieve 22, and to fall by the vibratory movement of lower sieve 22 into clean grain and tailings system 12 for further processing.

Figure 2:
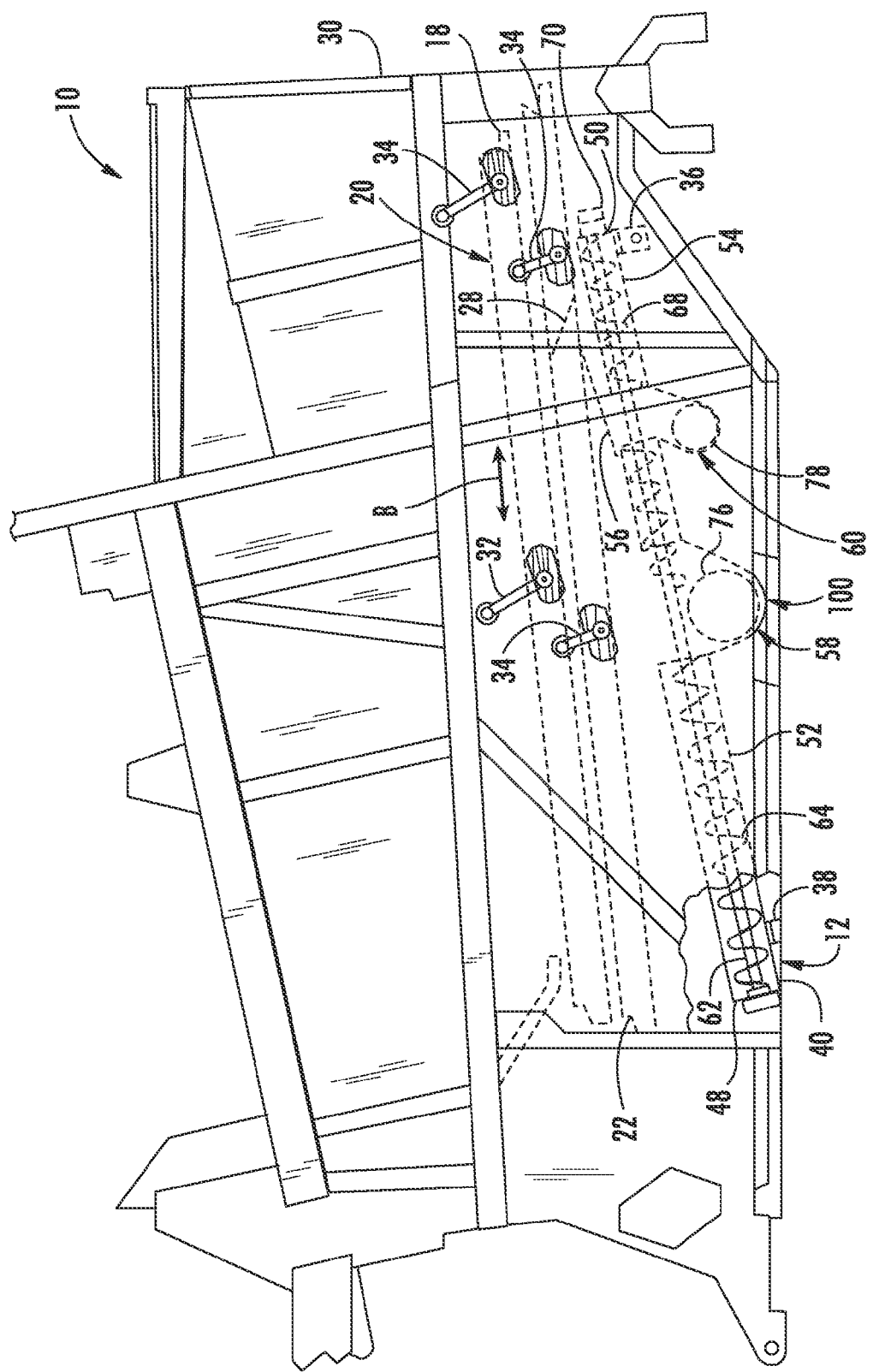
FIG. 2 is a side and partial cut-away view of a combine grain cleaning assembly incorporating aspects of the present invention.
Figure 3:
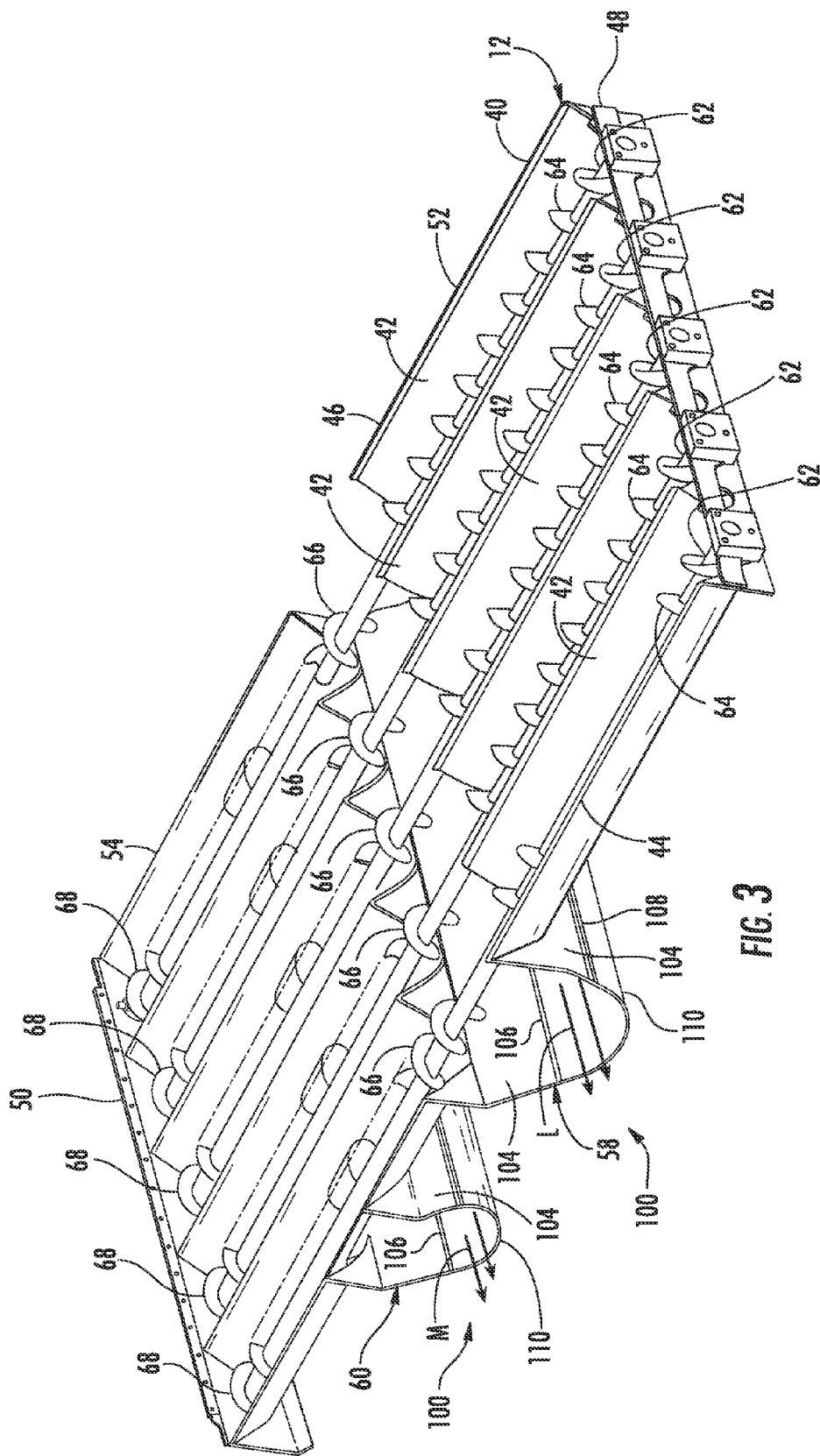
FIG. 3 is a perspective view of an auger conveying system incorporating aspects of the present invention.

Referring to FIGS. 2 and 3, certain elements of the cleaning system 20 are depicted in greater detail, as well as further details of the clean grain and tailings conveying system 12. In this regard, FIG. 2 illustrates the manner in which sieves 18 and 22 may be suspended from a structural frame 30 of combine 10 by pivoting support arms 32 and 34, respectively, for reciprocal fore and aft movement denoted by arrow B. Such movement may be readily effected by various suitable and well known reciprocating drive mechanisms (not shown) that operate in well-known manners. Clean grain and tailings conveying system 12 is depicted as being fixedly connected or mounted below lower sieve 22 of cleaning system 20 to structural frame 30 by brackets 36 and 38, so as to be immovable relative to structural frame 30.

The clean grain and tailings conveying system 12 of FIGS. 1 and 2, generally includes a pan 40 that is fixedly mounted to structural frame 30 by the brackets 36 and 38 so as to be located directly beneath lower sieve 22. This pan 40 may include an array of elongated, longitudinally extending collecting troughs 42 (FIG. 3) positioned side-by-side to another across the width of pan 40. Such collecting troughs 42 generally extend in the fore and aft direction, between a forward edge 48 and a rear edge 50 of trough 42. Each collecting trough 42 has a clean grain receiving portion 52 located beneath those regions of lower sieve 22 through which clean grain is expected to fall, and a tailings receiving portion 54 positioned beneath peripheral edge portion 28 of lower sieve 22. A deflector shield 56 is preferably disposed beneath the rear end portion of lower sieve 22 to deflect clean grain onto clean grain receiving portion 52 of pan 40, as opposed to tailings receiving portion 54 located below the rear end.

A clean grain auger trough 58 is disposed generally crosswise to and in communication with the clean grain collecting troughs 42 for receipt of clean grain from the troughs 42. The clean grain is conveyed along the clean grain auger trough 58 in the direction "L" indicated in FIG. 3. Similarly, a tailings auger trough 60 is disposed generally cross-wise to and in communication with the tailings collector troughs 42 of tailings receiving portion 54. Tailings are conveyed through the auger trough 60 in the direction "M" indicated in FIG. 3.

An elongated, helical auger 62 is supported in each collecting trough 42, with each auger 62 including a first helical auger flight 64 extending in a first predetermined rotational direction and a second helical auger flight 66 and third auger flight 68 extending in a second rotational direction opposite the first rotational direction. Each auger 62 is connected to a drive mechanism, which may include a bevel gear 70 on the rear end of auger 62 that meshes with a drive gear (not shown) rotated by any suitable drive, such as a belt, chain or shaft, in connection with a power plant of combine 10 (not shown).

When augers 62 are rotated in a predetermined rotational direction, flights 64, 66, and 68 will convey clean grain and tailings separately and simultaneously along collecting troughs 42, with clean grain from the clean grain collecting troughs being moved into clean grain auger trough 58 and tailings from the tailings collector troughs being moved into tailings auger trough 60. Clean grain auger trough 58 preferably has a helical auger 76 associated therewith and tailings auger trough 60 preferably has a similar auger 78 associated therewith, which augers are rotatable in the conventional manner using suitable drives (not shown) for conveying the clean grain and tailings, respectively, to a clean grain elevator (not shown) and a tailings return system (also not shown), in well-known manners.

The cleaning system 20 described above with respect to FIG. 2 incorporates one or more auger assemblies 100 in accordance with aspects of the invention. In particular, the clean grain auger trough 58 and the tailings auger trail 60 are configured with a removable clean-out cover member 110 (FIG. 3) as described in greater detail below.

Referring to FIG. 3, the clean grain auger trough and tailings auger trough 60 are depicted in greater detail. Each of the auger troughs includes downwardly extending side walls 104 having bottom edges 106. Side walls 104 and bottom edges 106 are permanently affixed to the respective auger troughs 58, 60. Guide tracks 108 are configured along the bottom edges 106 of each of the sides 104. In a particular embodiment, these guide tracks 108 are separately formed elements that are subsequently attached to the trough side walls 104 via mechanical means (e.g. bolts), spot welding, or any other suitable attachment means. In a particular embodiment depicted, for example, in FIG. 5, the guide tracks 108 are C-shaped channel members 114 having one side fixed along the bottom edge 106 of a respective trough side wall 104. The C-shaped channel members 114 have their open end oriented towards the opposite side wall 104. It should be appreciated that the guide tracks 108 may have various shapes and configurations to serve their functional purpose as set forth herein, and that the C-shaped channel members 114 depicted in the figures are merely one exemplary embodiment.

In an alternate embodiment, the guide tracks 108 may be defined by turned portions of the bottom edges 106 of the respective side walls 104. In other words, the side walls 104 may be formed into any suitable shape along their bottom edge 106 for sliding receipt of the removable bottom cover 110, as described in greater detail below.

Figure 4:
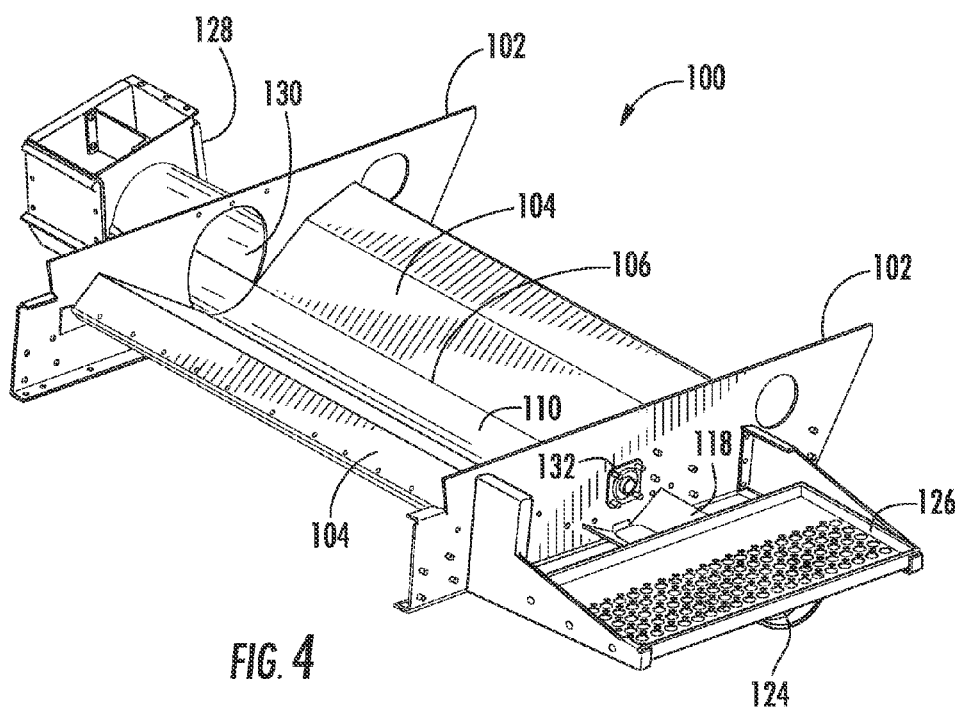
FIG. 4 is a perspective view of an auger trough assembly.
Figure 5:
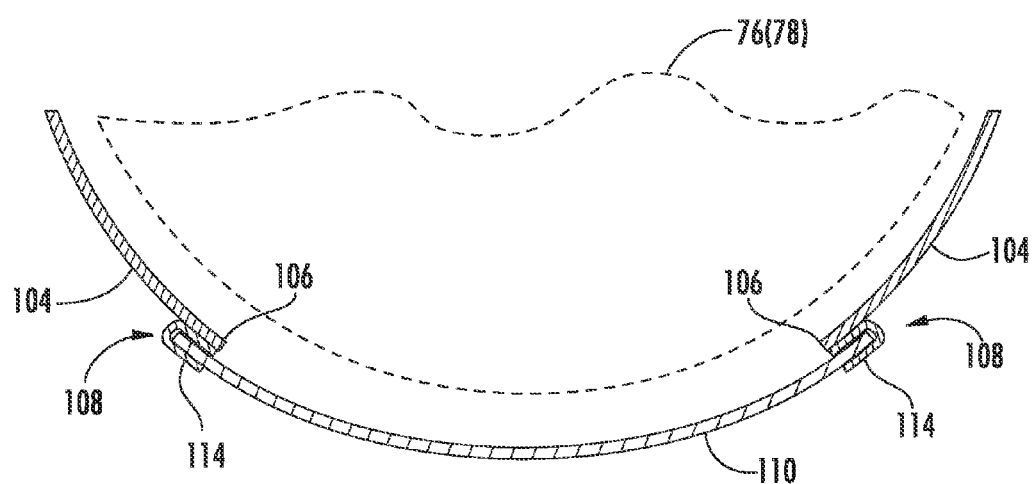
FIG. 5 is a partial cross-sectional view of an auger trough assembly.
Figure 6:
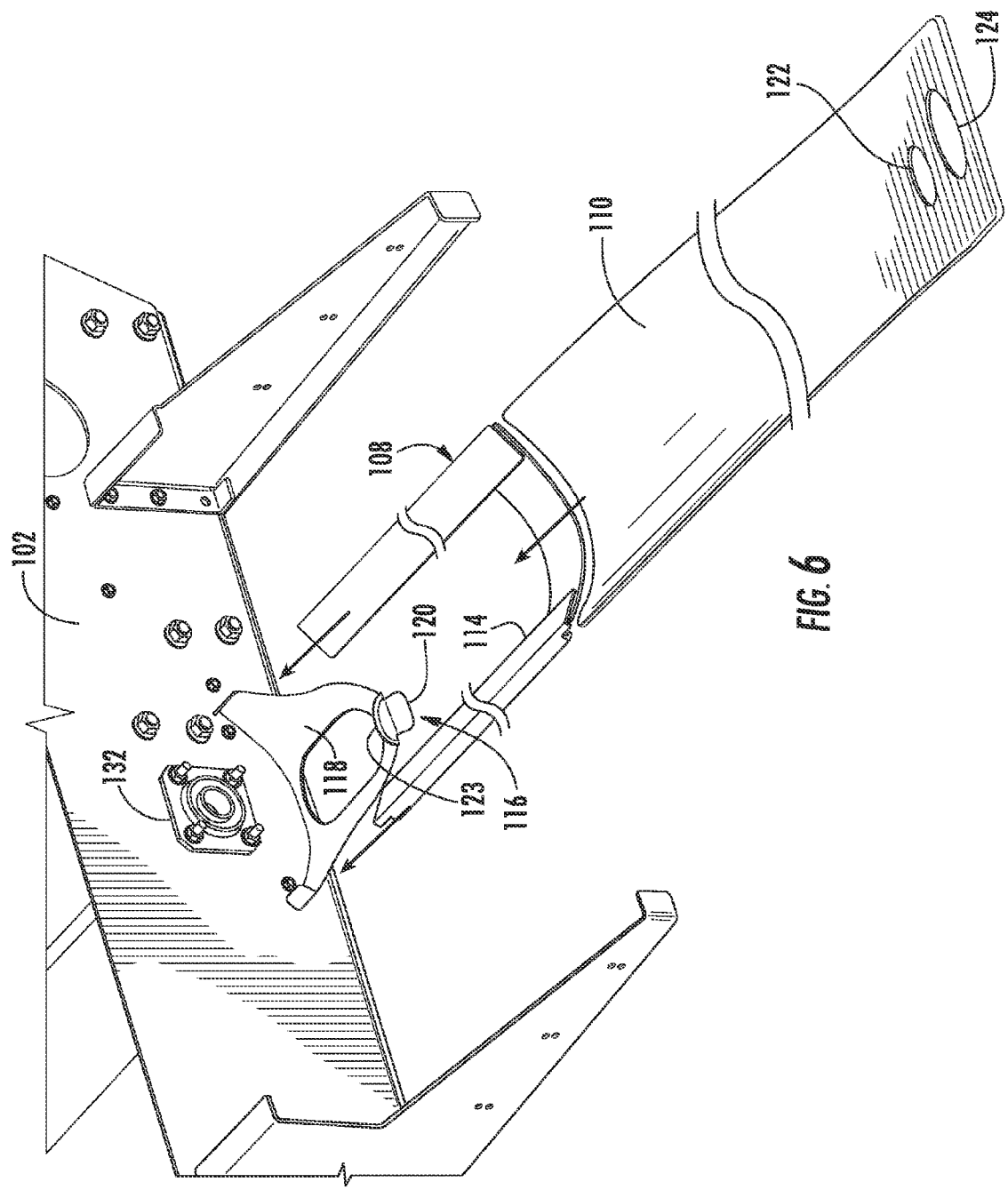
FIG. 6 is a component assembly view of an auger trough assembly.

Referring to FIGS. 3 through 6 in general, the auger assembly 100 includes a flexible bottom cover member 110 that is slidably engaged within the guide tracks 108. In this way, the bottom cover member 110 is slidably received within the guide tracks 108 and slidably removed from the guide tracks by an operator at a longitudinal end of the trough side walls 104. For example, referring particularly to FIGS. 4 and 6, the trough side walls 104 extend between opposite side sheets 102 of the auger assembly 100. For assembly, the guide tracks 108 may be inserted through one of the side sheets 102 to the opposite side sheet 102 and secured to the respective side walls 104, as generally depicted in FIG. 6. Then, the flexible bottom cover 110 may be inserted into the guide tracks 108 from a longitudinal end of the side walls 104 that is outboard of the side sheet 102. In this manner, the bottom cover member 110 may be removed from the auger tough for a clean-out procedure without an operator having to access the cover member 110 from below the auger trough.

Referring to FIGS. 6, 7A, and 7B, the bottom cover member 110 is desirably formed from a relatively flexible sheet material 112 that has a degree of flexibility and resiliency so as to have a relatively flat unrestrained shape when the sheet material 112 is laid on a flat supporting surface. The sheet material 112 may be bent into a conforming curvature for insertion into the guide tracks 108, as generally depicted in FIG. 6. The cover member 110 will assume the curvature dictated by the spacing of the guide tracks 108 as the cover member 110 is slid completely into the guide tracks 108.

It should be appreciated that any number of suitable sheet materials 112 may be used to form the bottom cover member 110, including flexible plastic sheet materials, conformable metal sheet metal, and so forth. In a particular embodiment, the bottom cover member is formed from an ultra-high-molecular-weight polyethylene (UHMWPE) material. Referring to FIG. 5, once inserted into the guide tracks 108, the flexible sheet material defines a curved bottom surface of the auger trough. In the embodiment depicted in the figures, the guide tracks 108 are generally continuous between the side sheets 102 of the auger assembly and are thus continuous along the bottom edges 106 of the auger walls 104. It should be appreciated that, in an alternate embodiment, the guide tracks 108 need not be continuous. For example, the guide tracks 108 may be defined by spaced apart sections along the bottom edges 106 of the auger walls.

Referring particularly to FIGS. 4 and 6, it may be desired to include a latch mechanism 116 operably configured between the bottom cover member 110 and the respective side sheet 102 through which the cover member 110 is inserted and removed from the auger assembly 100. This latch mechanism 116 may be variously configured for its intended purpose. In a relatively simple yet efficient embodiment, the latch mechanism 116 may be defined by a biased tab member 120 that engages within a recess or hole 122 defined at a longitudinal end of the cover member 110 so that, when the cover member 110 is completely inserted into the guide tracks 108, the tab 120 engages into the hole 122. In order to release the latch mechanism 116, a pull-up handle 123 may be provided on the biased tab 120, wherein the operator simply pulls upwardly on the handle 123 to disengage the tab 120 from the hole 122.

Referring to FIG. 6, a curved guide member 118 may be attached to the outer face of the side sheet 102 at the location where the guide tracks 108 and cover member 110 are inserted through the side sheet 102. This guide member 118 may serve to aid the cover member 110 into initially conforming to the design curvature for the bottom of the trough, as well as aiding in subsequent insertion of the remaining portion of the cover member 110.

It may also be desired to provide the cover member 110 with a handle 124 or like device that aids an operator in removing the cover member 110 from the trial assembly 100 by simply pulling laterally outward on the handle 124. In the depicted embodiment, the handle 124 is defined by relatively simple hole or recess in the end of the cover member 110.

Referring to FIG. 4, this particular embodiment of an auger assembly 100 is a clean grain auger trough wherein the bottom cover member 110 meets a generally cylindrical transition element 130 for subsequent conveyance of grain material into a grain elevator boot 128 via an auger 76 (FIG. 5) disposed within the auger trough. A bearing/drive connection 132 may be provided in the side sheet 102 for the auger 76. A platform 126 may be provided on the side sheet 102 whereby the operator may position himself for disengaging the latch mechanism 116 (FIG. 6) as well as removing the cover member 110 via the handle 124.

In the embodiment of FIG. 7B, the bottom cover member 110 is depicted as a perforated member that may be desired in certain processing applications, such as for harvesting edible beans or similar goods.

It should be readily appreciated that the present invention also encompasses any manner of combined harvester that incorporates one or more auger assembly 100 in accordance with aspects of the present invention. For example, the combine harvester 10 (FIG. 1) may have one or both of the clean grain and tailings augers 58, 60 configured in accordance with an auger assembly 100 as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combine harvester, comprising:
   an auger assembly positioned between opposed side sheets of the combine harvester, the auger assembly further including:
   an auger trough having side walls with a length so as to extend laterally between said opposed side sheets, said side walls having bottom edges;
   guide tracks configured along said bottom edges, to hold a flexible bottom cover member in place, the flexible bottom cover member being one continuously curving element;
   the flexible bottom cover member slidably engaged within said guide tracks without a lip attachment or a flange attachment, said flexible bottom cover member removably attached to said side walls by being slid into and out of said guide tracks from a longitudinal end of said side walls outboard of said side sheets; and
   wherein a spacing of the guide tracks dictate a curvature of the flexible bottom cover member when the flexible bottom cover is slid in the guide track, said flexible bottom cover member is removable from said auger trough for a clean-out procedure.

2. The combine harvester of claim 1, wherein said flexible bottom cover member comprises a flexible sheet material that has a flat unrestrained shape.

3. The combine harvester of claim 2, wherein said flexible sheet material is perforated along at least a section thereof.

4. The combine harvester of claim 1, wherein said guide tracks are continuous along said bottom edges of said side walls between said side sheets.

5. The combine harvester of claim 4, wherein said guide tracks comprise generally C-shaped channel members fixed to said side walls.

6. The combine harvester of claim 1, further comprising a latch mechanism configured between said cover member and a respective said side sheet to retain said cover member in position relative to said side walls.

7. The combine harvester of claim 6, wherein said latch mechanism comprises a biased tab member fixed to said side sheet that engages into a hole defined in said cover member.

8. The combine harvester of claim 6, further comprising a handle configured on a longitudinal end of said cover member to allow an operator to pull said cover member out of said guide tracks.

9. The combine harvester of claim 1, wherein said auger assembly is a clean grain auger assembly for said combine harvester.

10. The combine harvester of claim 1, wherein said auger assembly is a tailings auger assembly for said combine harvester.

11. A combine harvester, comprising:
    a clean grain and tailings conveyance system, said conveyance system further comprising a clean grain auger trough and a tailings auger trough operably configured between opposed side sheets of said combine harvester, at least one of said clean grain or tailings augers comprising:
    an auger trough having side walls with a length so as to extend laterally between said opposed side sheets, said side walls having bottom edges;
    guide tracks configured along said bottom edges, the guide tracks to hold a flexible bottom cover, the flexible bottom cover being one continuously curving element;
    the flexible bottom cover member slidably engaged within said guide tracks without requiring a lip attachment or a flange attachment, the guide tracks dictate a curvature of the flexible bottom cover member when slidably engaged therewith, said flexible bottom cover member removably attached to said side walls by being slid into and out of said guide tracks from a longitudinal end of said side walls outboard of said side sheets; and
    wherein said flexible bottom cover member is removable from said auger trough for a clean-out procedure.

12. The combine harvester as in claim 11, wherein said flexible bottom cover member comprises ultra-high-molecular-weight polyethylene (UHMWPE) material.

13. The combine harvester as in claim 12, wherein said flexible bottom cover member comprises a sheet material that has a flat unrestrained shape and is perforated along at least a section thereof.

14. The combine harvester as in claim 11, wherein said guide tracks are continuous along said bottom edges of said side walls between said side sheets.

15. The combine harvester as in claim 14, wherein said guide tracks comprise generally C-shaped channel members fixed to said side walls.

16. The combine harvester as in claim 11, further comprising a latch mechanism configured between said cover member and a respective said side sheet to retain said cover member in position relative to said side walls.

17. The combine harvester as in claim 16, wherein said latch mechanism comprises a biased tab member fixed to said side sheet that engages into a hole defined in said cover member.

18. The combine harvester as in claim 16, further comprising a handle configured on a longitudinal end of said cover member to allow an operator to pull said cover member out of said guide tracks.

* * * * *